United States Patent

[11] 3,608,725

[72] Inventor William A. Oden
 Temple City, Calif.
[21] Appl. No. 865,730
[22] Filed Oct. 13, 1969
[45] Patented Sept. 28, 1971
[73] Assignee Domain Industries, Inc.
 New Richmond, Wis.

[54] AUTOMATIC, SELF-CLEANING AIR RELIEF SYSTEM FOR DIATOMACEOUS EARTH FILTER TANKS
5 Claims, 2 Drawing Figs.

[52] U.S. Cl. ................................................. 210/169,
 210/331
[51] Int. Cl. ................................................. E04h 3/16
[50] Field of Search ....................................... 210/169,
 106, 108, 331, 333, 349, 425, 436, 486; 250/43

[56] References Cited
UNITED STATES PATENTS
2,648,774 8/1953 Whitlock .................. 250/43
3,297,163 1/1967 Landon ..................... 210/331

Primary Examiner—Reuben Friedman
Assistant Examiner—T. A. Granger
Attorney—Williamson, Palmatier & Bains ABSTRACT: A system and apparatus for combination with conventional water filter systems for pools and the like which continually relieves accumulation of air in the filter tank and redistributes such air to the pool or other reservoir. The system employs an upwardly extending air withdrawal passage filtered at its upper end for entrance of air at the top of the filter tank, and having communication at its lower end with the effluent discharge or water stream emanating from the manifold or other main discharge of cleansed water from the filter tank. The apparatus also preferably includes a water diverting means for deflecting water through the air withdrawal passage in backwash operation of the general filtering system to thus clean the filter of the air withdrawal passage.

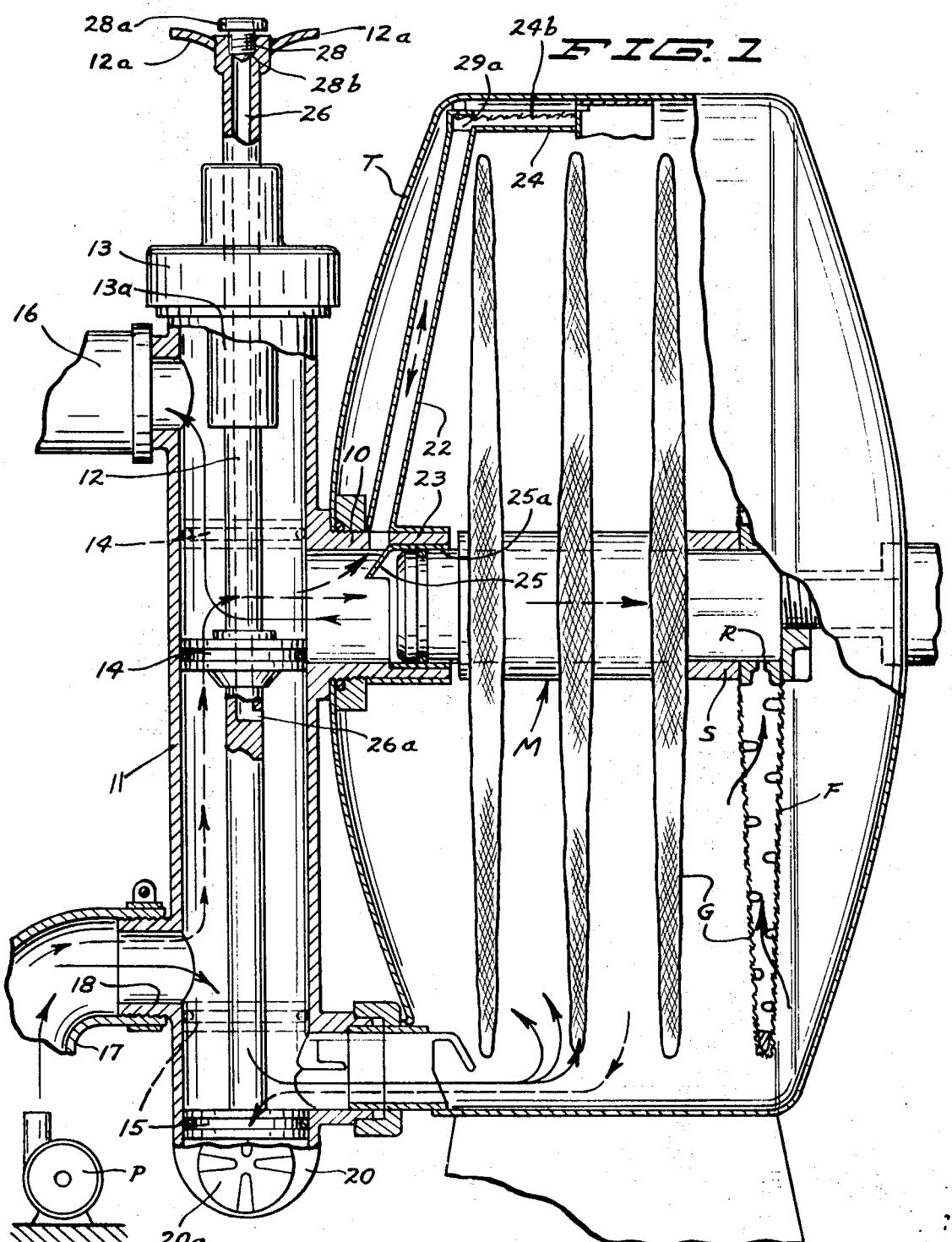

3,608,725

AUTOMATIC, SELF-CLEANING AIR RELIEF SYSTEM FOR DIATOMACEOUS EARTH FILTER TANKS

This invention relates generally to water and other liquid filter systems which employ a filter tank with filter elements and diatomaceous earth and which tank is connected with a pool or other reservoir. More specifically, the invention provides in filter systems of the class set forth apparatus for constantly and automatically relieving and dispelling accumulating air from the upper portion of the filter tank during use of the filter system.

The accumulation of air is common in diatomaceous earth and other conventional systems, and such accumulation substantially lowers the efficiency of the filter system by displacing or lowering the water level of the tank below the upper portions of the filter grids or the like. The prior art, to my knowledge, only provides a manually operable pressure release valve in the upper portion of the filter tank which, in use, is occasionally opened and which cannot function to maintain proper levels of the liquid in the tank and to assure proper hydraulic flow through the system and back to the swimming pool or other reservoir.

My invention has for a more specific object the provision of apparatus which may be readily installed and which cooperates with some of the essential components of the conventional filtration system to at all times relieve to the extent desired air accumulating in the filter tank through the intake of water or liquid from the powered pump. With my improved and new apparatus and system the filtering apparatus may continuously operate through the desired time interval and optimum performance may be assured as long as the filter fabrics of the filter grids or the like have adequate porosity.

It is a further object to provide an apparatus and a system of the class defined wherein the cooperating components are self-cleaning and will not in any way interfere with the operation of the backwash cleansing circulation of the filtering apparatus.

My improved system by the addition and close combinative cooperation with conventional parts of the filter tank manifold and backwash valve housing and valve elements accomplishes the new and improved results heretofore related in this specification. An important feature and advantage of my new system is that it is extremely simple, requiring essentially in combination with the conventional filter apparatus and tank now employed only three main additional components, to wit, first, an air relief manifold having its intake and upper end disposed within the top of the filter tank and having a lower discharge which is connected for air induction with the discharge of the effluent and cleansed water from the manifold of the main filter apparatus; secondly, a valved air relief for facilitating draining of the tank only after backwash cleansing action has been completed; and thirdly, a diverter or deflector element positioned and combined with the first-mentioned air relief manifold to cause water flow upwardly through the air relief manifold in the backwash action thereby cleaning the filtered entrance through the relief manifold and thus breaking the seal which otherwise is created to facilitate drainage of the entire tank when such is essential.

The foregoing objects and advantages of this invention will be more apparent from the following description made in connection with the accompanying drawings wherein like reference characters refer to similar parts throughout the several views and in which:

FIG. 1 is a central or axial vertical section showing in general a rather conventional type of water filter employing a plurality of axially disposed and axially spaced filter grids of conventional structure mounted upon a common manifold and all disposed within a conventional filter tank and in proper working relation with a backwash cleansing system including valve housing and double-backwash valve, such apparently conventional structure having combined therewith an embodiment of my self-cleaning air relief system. FIG. 1 also includes dotted line positions of the two valves carried by the backwash apparatus together with two series of arrows indicating travel of water in the normal filtering operation of the apparatus and also in the backwash operation of the apparatus; and FIG. 2 is a perspective view of a combined diverter element and bearing which acts to deflect water upwardly through an air tube in backwash operation, and which also forms the bearing for facilitating oscillation of the filter manifold.

Referring now in detail to the form of the invention disclosed in FIGS. 1 and 2, a conventional type of filter tank T is illustrated, the lower portion of which is shown in cross section, having mounted therein the horizontally disposed manifold M which interconnects a plurality of spaced grids G, of conventional type, each having applied to the faces thereof a water-porous filter fabric F, as shown in the right-hand grid of FIG. 1. The grids G are spaced apart on the manifold by spacer rings S in conventional manner, and each grid communicates with the interior of the manifold through a plurality of radial ports R.

The outlet end of the manifold M communicates and is connected with a central horizontal sleeve 10 which, as shown, is integrally formed with a vertical cylindrical backwash valve casing 11, of conventional type. Valve casing 11 is capped at its upper end by a threaded upstanding cap 13, which has a central depending supporting sleeve 13a having slidably connected and sealed therewith an elongate backwash valve plunger 12 which extends the full length of valve casing 11 and is longitudinally shiftable in cap 13. Valve plunger 12 at its intermediate portion carries a piston valve 14, which, as shown in the drawings, is positioned in a lowered predetermined position to close off the bottom of the valve casing and permit effluent flow of water from the manifold upwardly into a return fitting or sleeve 16 which communicates by pipeline to the pool or other main source of water or liquid.

The lower end of valve plunger 12 conventionally carries a backwash piston valve 15 which, as shown in its lowermost position, permits normal filtering flow of water by action of a large pump P rearwardly through the bottom portion of the tank, as indicated by the arrows, and thereafter normally through the filter fabric and grids into the manifold.

The water drawn from the pool into the tank enters normally through a conduit 17 which is connected with an entrance sleeve 18 disposed at the forward and lower portion of the vertical valve casing 11. A forward transverse sump 20 is provided in conventional manner below the forward portion of the tank T having at one end thereof a drain exit 20a for removal of sludge and waste in the system.

In the normal operation of the conventional filter apparatus previously described for filtering operation, the plunger 12 is depressed through actuation of its upper handle 12a to position the lower circular valve 15 in the full line position as shown, and with the upper valve 14 also disposed in full line position as shown on the drawings. This, with operation of the pump P, draws water through the pump and through the conduit 17 and sleeve 18 into the lower portion of the filter tank where in filtering operation this water circulates and moves in directions as indicated by the full line arrows of the drawing. This water is cleansed by diatomaceous earth entering the filter fabrics F of the several grids G and passing therefrom radially inward to the axial manifold M and through that manifold into the upper portion of the backwash valve casing 11 upwardly and returning to the pool or other main water supply through conduit 16. After continuous operation for a predetermined period of time, the porosity of the filter fabrics F on the several grids G are lowered and the pores actually clogged or contaminated to the point where cleansing is required.

In conventional filter systems of the class described, backwash operation is usually included which, in the conventional portions of the structure herein illustrated, means that first the valves 14 and 15 are shifted to their dotted line positions shown on the drawings by substantial upward movement of the plunger 12 through its handle 12a. In such backwash position it will be noticed that the lower valve 15 is raised to its uppermost dotted line position while the upper valve 14 is positioned as shown in dotted lines above the area of communication from the manifold to the valve casing. The pump then delivers water above lower valve 15 into the lower portion of the upstanding large valve casing 11 and flows such water upwardly into the normally discharge end of the manifold, through said manifold and then radially outward through the passages R into the interior of the several grid filter elements G forcing particles of dirt and other material which are then clogging the filter fabrics outwardly and thereby cleansing the grids and their filtering fabrics. After such operation often the clogging and contamination matter is washed down and the tank drained by causing such material to flow downwardly to the sump at the lower portion of the tank whereafter such material with the water is drained off to waste.

Referring now to the new and improved air relief system embodying my invention, and particularly to the essential components and devices which cooperatively are added to the conventional structures heretofore described, I provide an upwardly extending air relief manifold which, as shown, is in the form of a slightly declined upwardly extending conduit 22 having communication at its lower end with the outlet sleeve or other equivalent 23 which is concentric with and communicates with the normally discharge effluent end of manifold M. The upper end of the manifold and connected to the upper end of conduit 22, employs a wide and generally horizontal head 24 having communication at its forward portion through a passage 24a with the top portion of the conduit 22. This air-receiving head 24 is disposed in the highest portion of the filter tank and may, if desired, be curved in cross section, although this is not necessary. It has an imperforate bottom, side and end walls and it has a top wall covering 24b which constitutes a filter element of suitable size and may be of specially woven filter cloth of equal efficiency and preferably of similar porosity to the filter fabrics F which cover the filter grids G.

A baffle diverter 25 depends from the axial sleeve 23 which is in communication with the manifold and extends downwardly and forwardly (to the left as shown) to divert in the backwash operation of the apparatus a small proportion of the then-incoming water to cause the same to travel upwardly through the interior of conduit 22 and through the head 24. This diversion of water passes through the head 24 to the top of the tank and unclogs the pores of the filter element 24b.

It is essential to the operation of my improved system that an air induction system be provided to permit and substantially assist in the draining of the filter tank after the filter fabrics have been cleansed. To such end the upper portion of plunger 12, or if desired an additional conduit, is provided with an internal concentric vertical air passage 26 which extends to the top of the plunger and downwardly at least to a point to communicate by lateral discharge air opening 26a with the water contained in backwash housing 11. At the upper end of the internal air passage 26, and as shown supported by threaded engagement with the axial portion of the valve handle 12a, I provide a small conical air induction valve 28 which has an operating handle 28a affixed thereto. As shown, the upper stem portion of the valve 28 is externally threaded to loosely engage threads tapped into the upper portion of the backwash valve plunger 12. After tapping said upper portion, a conical valve seat 28b is formed for engagement with the conical valve element. Thus turning of the valve handle 28a clockwise will close the valve while counterclockwise turning will open the valve for entrance of air to break the seal and facilitate emptying of the filter tank T. It will be understood that this air induction system and the opening of the valve 28 is only employed when it is desired to flush out or drain contamination or waste material from the filter tank T.

It should be noted that the water diverter lip 25, as shown in FIG. 2, is preferably integrally formed with a bearing ring 25a which journals, as shown, the forward end of filter mainfold M. This bearing permits oscillation of the manifold and its superimposed grids for additional cleansing purposes during backwash operation.

OPERATION

The general operation of my improved air relief system and apparatus will be obvious from the foregoing description.

It should be pointed out, however, that in the normal filtering operation of the water filter system for a swimming pool or other relatively large reservoir, the valves 14 and 15 carried by the elongate backwash plunger 12 are positioned as shown in full lines in FIG. 1 and pump P then causes waterflow, as indicated by the unbroken arrows, to the lower portion of the tank T and then by distribution upwardly and in impingement with the filter fabrics F of the several grids G. The cleansed water enters the manifold M through the multiplicity of radial ports R (one of which is shown in FIG. 1) and flows through the manifold, to the left as shown in FIG. 1, and out of the manifold and its communicating sleeve 10 into the upper portion of the backwash housing 11. From there it returns through a conduit or conduit system 16 to the pool or reservoir, carrying with it quantities of air collected from the top of the interior of the tank T.

The effluent stream of water moving out of manifold M and upwardly into the return conduit 16, through the arrangement of the lower connection of the air passage 22, induces flow of air through the filter cloth of the head 24 of the air discharge manifold 22 downwardly into the effluent stream. This function is continuous throughout the normal filtering operation of the overall system.

When it is desired to cleanse and unclog the filter fabrics F mounted within the tank T, the valve plunger 12 is elevated to bring the valves 14 and 15 into their dotted line positions shown in FIG. 1. At such time water from the pool flows in the directions indicated by the dotted arrows of FIG. 1 first passing upwardly through the lower portion of backwash casing 11 and then turning to flow axially into the normal discharge end of the manifold M. The backflow water passing through the manifold in the direction of the dotted arrows communicates internally with the several grids G and forces water out of the filter fabrics F to cleanse and unclog the same. The same reverse flow of water through the manifold, because of the diverter lip 25, causes a small portion of the backflow to be deflected upwardly through the air manifold or conduit 20, said upward flow of water flushing the head 24 and unclogging the filter top 24b.

Thus my apparatus for continuously relieving collection of air from the tank is self-cleaning and automatic in nature.

When it is desired to drain the contents of filter tank T and remove remaining diatomaceous earth, sludge and contaminants therefrom, the pump P may be shut off and the air valve 28 opened to permit gravity to drain the contents of the tank into the sump 20 and, when desired, discharge through the discharge outlet 20a.

From the foregoing description it will be seen that a very simplified apparatus and system has been provided for continuously relieving accumulation of air from the top of conventional filter tanks and for continuously returning air in small quantities with the effluent discharge of cleansed water to the pool or reservoir. My system employs only a minimum of additional elements working in close cooperation with the conventional elements of water filter systems used for swimming pools and other reservoirs. Most of such systems include a backwash casing and valves or the equivalent and it should be noted that diverter means supplied by my apparatus causes diversion of a portion of the backwash water for automatically cleansing and unclogging the filter head of the normally operative air withdrawal manifold.

What is claimed is:

1. In combination with a liquid filter system for a reservoir, such as a pool, which employs a filter tank having filter elements therein which internally communicate with an effluent discharge of cleansed liquid returned to said reservoir, said system also including a recirculating medium such as a pump, apparatus for continuously relieving collecting air from the upper portion of said filter tank and for returning the same to said reservoir, having in combination, an air withdrawal passage having a filtered intake at an upper portion thereof in communication with the topmost portion of said tank to withdraw air therefrom, said passage having communication adjacent its opposite and lower end with the effluent discharge stream of cleansed liquid from said filter tank and so communicating therewith to induce downward flow of air from the top of said tank, said filter system having means for reversing the flow of liquid in a backwash operation to unclog filter elements within said tank, and a liquid diverter means projected into a conduit providing for backwash liquid to cause, during backwash operation, a proportion of said backwash liquid to be deflected upwardly through said air passage and outwardly through the filter medium at the upper end of said passage.

2. In combination with a water filter system which includes a filter tank having spaced filter grid elements communicating internally with a common manifold, said manifold in filter operation discharging effluent to a common backwash valve casing having communication with a pool or other reservoir, which also includes a pump for circulating water from said pool or reservoir through said filter tank, and valve means in said backwash casing for, in one position, returning cleansed water from the effluent of said manifold into said reservoir and in a second position shutting off return of effluent water to said reservoir while causing flow of water from said pump in reverse fashion through said manifold and said grids into said tank, a system for continuously relieving and redistributing air collecting in the upper portion of said filter tank during filtering operation, having in combination, an upwardly extending air withdrawal passage having communication at its lower end with said effluent discharge stream from said manifold for normally inducing downward flow of air from the top of said tank into said effluent stream, and also having at its upper end a filtered head in communication with the upper interior portion of said filter tank, and a water diverting deflector below the lower end of said air discharge conduit for diverting water upwardly through said conduit and through the filtered head of said conduit during reverse backwash flow of water through said manifold.

3. The structure and combination set forth in claim 2 further characterized by a normally closed air relief passage communicable at an upper end disposed externally of said filter tank and backwash casing and having communication at a lower portion with the liquid in the upper portion of said backwash casing to facilitate draining of said filter tank when opened to atmosphere at its upper end.

4. The structure set forth in claim 3 further characterized by an air valve disposed adjacent the upper end of said air relief passage.

5. In combination with a water filter system which includes a filter tank having spaced filter grid elements communicating internally with a common manifold, said manifold in filter operation discharging effluent to a common backwash valve casing having communication with a pool or other reservoir, which also includes a pump for circulating water from said pool or reservoir through said filter tank, and valve means in said backwash casing for, in one position, returning cleansed water from the effluent of said manifold into said reservoir and in a second position shutting off return of effluent water to said reservoir while causing backwash flow of water from said pump in reverse fashion through said manifold and said grids into said tank, a system for continuously relieving and redistributing air collection from the upper portion of said filter tank during filtering operation and for also during backwash flow of water cleansing the inner receiving end of air collection means, having in combination, an upwardly extending dual-purpose conduit having communication at its lower end in a substantially axial manner with said effluent discharge stream from said manifold for normally inducing downward flow of air from the top of said tank into said effluent stream, and having at its upper end a head in communication with the upper interior portion of said tank, the lower end of said conduit being shaped and axially positioned to divert water during reverse backwash flow through said manifold, to produce upward flow through said conduit thereby rinsing the upper end of said conduit for the next cycle of air collection relief.